(12) United States Patent
Ahn (10) Patent No.: US 9,194,689 B2
(45) Date of Patent: Nov. 24, 2015

(54) APPARATUS FOR MEASURING DISPLACEMENT

(71) Applicant: Foundation of Soongsil University-Industry Cooperation, Seoul (KR)

(72) Inventor: Hyeong-Joon Ahn, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 110 days.

(21) Appl. No.: 14/141,531

(22) Filed: Dec. 27, 2013

(65) Prior Publication Data

US 2014/0285184 A1   Sep. 25, 2014

(30) Foreign Application Priority Data

Mar. 21, 2013   (KR) .................. 10-2013-0030444

(51) Int. Cl.
*G01B 7/14*   (2006.01)
*G01D 5/244*   (2006.01)
*G01D 5/245*   (2006.01)

(52) U.S. Cl.
CPC ............... *G01B 7/14* (2013.01); *G01D 5/2451* (2013.01); *G01D 5/24476* (2013.01)

(58) Field of Classification Search
CPC ............ G01B 7/00; G01B 7/14; G01B 7/003; G01D 5/00; G01D 5/14; G01D 5/145; G01D 5/16; G01D 5/244; G01D 5/24476; G01D 5/245; G01D 5/2451
USPC .................. 324/207, 235, 251, 252; 338/32 R
See application file for complete search history.

(56) References Cited

U.S. PATENT DOCUMENTS

| | | | | |
|---|---|---|---|---|
| 4,595,991 A * | 6/1986 | Spies | ................ | G01D 5/24409 33/1 L |
| 4,782,229 A * | 11/1988 | Ernst | ..................... | G01D 5/366 250/208.6 |
| 5,619,132 A * | 4/1997 | Spies | ....................... | 324/207.21 |
| 6,492,806 B2 * | 12/2002 | Shirai | ..................... | G01C 1/02 324/207.12 |
| 7,196,511 B2 * | 3/2007 | Shiraki | ............... | G01D 5/2451 324/207.21 |
| 8,129,984 B2 * | 3/2012 | Hosek et al. | ............ | 324/207.24 |
| 8,134,359 B2 * | 3/2012 | Nishizawa et al. | ...... | 324/207.25 |

FOREIGN PATENT DOCUMENTS

KR   10-1078078 B   10/2011

* cited by examiner

*Primary Examiner* — Melissa Koval
*Assistant Examiner* — Rahul Maini
(74) *Attorney, Agent, or Firm* — Mintz Levin Cohn Ferris Glovsky and Popeo, P.C.; Kongsik Kim; Jonathon Western (57) ABSTRACT

An apparatus for measuring displacement is disclosed. The disclosed displacement measurement apparatus may include a magnet unit having magnet sub-units arranged repeatedly in a particular pitch (p) to generate a sine-wave magnetic flux density; a sensor unit including a sensor array for measuring the sine-wave magnetic flux density; and a measurement part configured to measure a displacement of the magnet unit and the sensor unit displaced relatively to each other, based on the measured value of the sine-wave magnetic flux density, where the sensor array comprises two or more sensors arranged separated by a gap of p/k in-between (where k is $2^n$, n is an integer greater than or equal to 1) along an arrangement direction of the magnet sub-units.

14 Claims, 11 Drawing Sheets

APPARATUS FOR MEASURING DISPLACEMENT

CROSS-REFERENCE TO RELATED APPLICATIONS

This application claims the benefit of Korean Patent Application No. 10-2013-0030444 filed on Mar. 21, 2013 and Korean Patent Application No. 10-2013-0147638 filed on Nov. 29, 2013, which applications are incorporated herein by reference.

TECHNICAL FIELD

Embodiments of the present invention relate to an apparatus for measuring displacement, more particularly to a displacement measurement apparatus which can remove harmonic waves to stabilize measurement values and in which the number of sensors for measuring displacement is minimized to allow an efficient use of space.

RELATED ART

A Hall sensor is a component that varies a voltage according to the intensity of a magnetic field.

A displacement measurement apparatus that employs a Hall sensor may measure a displacement from the change in voltage value measured by the Hall sensor when a magnet is moved or the orientation of a magnetic field is changed near the Hall sensor.

In the case of a conventional displacement measurement apparatus using a Hall sensor, however, harmonic waves of the magnetic flux density generated by a magnet can result in unstable measurement values.

Also, a Hall sensor array may have to be implemented independently for each direction of displacement measurement, so that the number of Hall sensors cannot be minimized, and the increase in the number of sensor arrays can make it difficult to obtain an efficient use of space.

SUMMARY

To resolve the above problems in the related art, an aspect of the invention aims to provide a displacement measurement apparatus which can remove harmonic waves to stabilize measurement values and in which the number of sensors for measuring displacement is minimized to allow an efficient use of space.

To achieve the objectives above, an embodiment of the invention provides an apparatus for measuring displacement that includes: a magnet unit having magnet sub-units arranged repeatedly in a particular pitch (p) to generate a sine-wave magnetic flux density; a sensor unit including a sensor array for measuring the sine-wave magnetic flux density; and a measurement part configured to measure a displacement of the magnet unit and the sensor unit displaced relatively to each other, based on the measured value of the sine-wave magnetic flux density, where the sensor array comprises two or more sensors arranged separated by a gap of p/k in-between (where k is $2^n$, n is an integer greater than or equal to 1) along an arrangement direction of the magnet sub-units.

Another embodiment of the invention provides an apparatus for measuring displacement that includes: a magnet unit having magnet sub-units arranged repeatedly in a particular pitch (p) to generate a sine-wave magnetic flux density; a sensor unit including a sensor array for measuring the sine-wave magnetic flux density; and a measurement part configured to measure a displacement of the magnet unit and the sensor unit displaced relatively to each other, based on the measured value of the sine-wave magnetic flux density, where the sensor array comprises a k number of sensors arranged separated by a gap of p/k in-between (where k is $2^n$, n is an integer greater than or equal to 1) along an arrangement direction of the magnet sub-units.

Still another embodiment of the invention provides an apparatus for measuring displacement that includes: a magnet unit having magnet sub-units arranged repeatedly to generate a magnetic flux density; a sensor unit including a sensor array for measuring the magnetic flux density; and a measurement part configured to measure a displacement of the magnet unit and the sensor unit displaced relatively to each other, based on the measured value of the magnetic flux density, where the sensor array comprises a $2^n$ (n is a natural number) number of sensors arranged separated by a particular distance in-between along an arrangement direction of the magnet sub-units, the $2^n$ number of sensors comprise a first sensor pair having a 1-a sensor and a 1-b sensor arranged separated by a gap of $\lambda_M/2$ in-between, and a second sensor pair having a 2-a sensor and a 2-b sensor arranged separated by a gap of $\lambda_M/2$ in-between, where $\lambda_M$ is a wavelength of an M-th order harmonic wave forming the magnetic flux density, and the center point between the 1-a sensor and the 1-b sensor and the center point between the 2-a sensor and the 2-b sensor are arranged separated by a gap of $\lambda_N/2$ in-between, where $\lambda_N$ is a wavelength of an N-th order harmonic wave forming the magnetic flux density.

Certain embodiments of the invention can be used to remove harmonic waves of a magnetic flux density to stabilize measurement values.

Also, certain embodiments of the invention can minimize the number of sensors used for the displacement measurement, to allow an efficient use of space.

Additional aspects and advantages of the present invention will be set forth in part in the description which follows, and in part will be obvious from the description, or may be learned by practice of the invention.

DETAILED DESCRIPTION

As the present invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, like reference numerals are used for like elements.

Certain embodiments of the invention will be described below in more detail with reference to the accompanying drawings.

Figure 1:
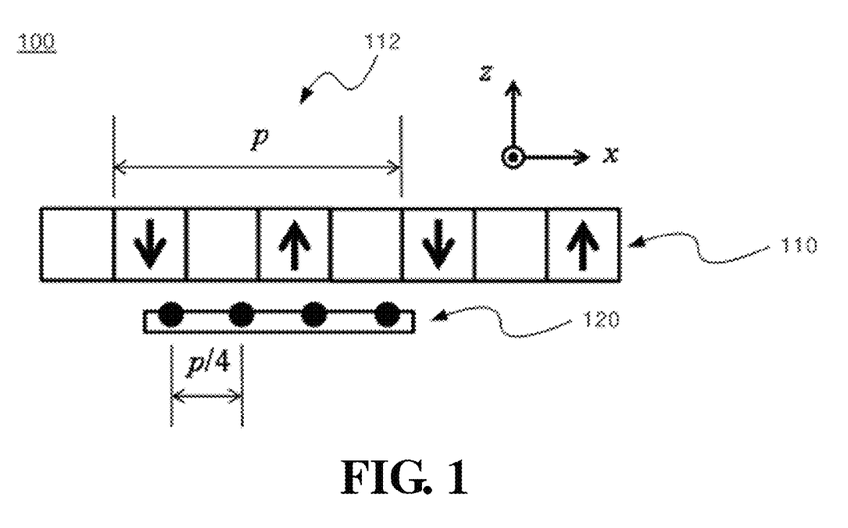
FIG. 1 schematically illustrates the composition of a displacement measurement apparatus according to an embodiment of the invention.

FIG. 1 schematically illustrates the composition of a displacement measurement apparatus 100 according to an embodiment of the invention.

As illustrated in FIG. 1, a displacement measurement apparatus 100 may include a magnet unit 110, a sensor unit 120, and a measurement part (not shown).

The magnet unit 110 may have magnet sub-units 112 arranged repeatedly in a particular pitch (p) to generate a sine-wave magnetic flux density. The arrows represent the magnetic flux directions.

For easier description, it will be assumed that the row direction of the arrangement of magnet sub-units 112 is the x-direction, the column direction is the y-direction, and the direction orthogonal to the x-direction and y-direction is the z-direction.

The sensor unit 120 may include a sensor array that measures the sine-wave magnetic flux density generated by the magnet unit 110.

For measuring the magnetic flux density, a sensor according to an embodiment of the invention can be a Hall sensor that outputs the measured magnetic flux density as a voltage value. However, the invention is not limited thus.

The sensor array may comprise two or more sensors that are arranged separated by a gap of p/k in-between along an arrangement direction of the magnet sub-units 112. Here, k can be expressed as $2^n$, n being an integer greater than or equal to 1.

By virtue of this sensor array, at least one of the fundamental wave through the k/2-th order harmonic wave component of the sine-wave magnetic flux density generated by the magnet unit 110 having a particular pitch (p) can be canceled. First, a description is provided for an example in which one of the fundamental wave through the k/2-th order harmonic wave component is canceled.

As illustrated in FIG. 1, a sensor array may comprise four Hall sensors, and if it is assumed that n equals 2 and k equals 4, then the four Hall sensors can be arranged with a separation of p/4 in-between the sensors, along the row direction of the magnet sub-unit array (i.e. the x-direction).

Since the measurement values of the four Hall sensors can be canceled by addition, the second-order harmonic wave component of the sine-wave magnetic flux density generated by the magnet unit having a pitch p can be canceled.

More specifically, as the four Hall sensors are arranged separated by a gap of p/4 in-between, the measurement values of two Hall sensors that are arranged separated by p/4, from among the measurement values of the four Hall sensors, would satisfy the equation $\sin(2x)+\sin(2x+\pi)=0$ and cancel each other out, so that the second-order harmonic wave component of the sine-wave magnetic flux density can be canceled.

For further explanation, consider an example in which a sensor array comprises two Hall sensors, n equals 1, and k equals 2, so that the two Hall sensors are arranged separated by a gap of p/2 in-between along the row direction of the magnet sub-unit array. Then, the measurement values of the two Hall sensors that are arranged separated by p/2 would satisfy the equation $\sin(x)+\sin(x+\pi)=0$, so that the fundamental wave of the sine-wave magnetic flux density can be canceled.

Figure 2:
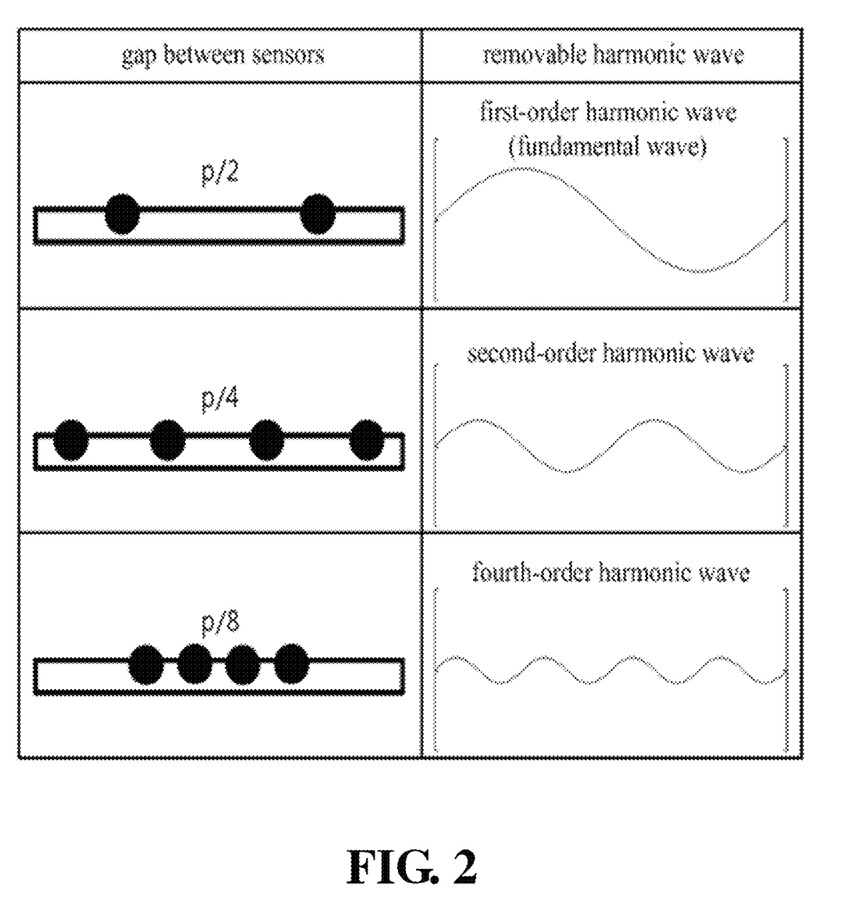
FIG. 2 schematically illustrates the fundamental wave and harmonic wave components that are removable according to sensor arrays according to an embodiment of the invention.

FIG. 2 schematically illustrates the fundamental wave and harmonic wave components that are removable according to sensor arrays according to an embodiment of the invention.

As illustrated in FIG. 2, two Hall sensors that are arranged separated by a gap of p/2 in-between (i.e. k equals 2, and n equals 1) can remove the fundamental wave (i.e. k/2), at least two Hall sensors that are arranged separated by a gap of p/4 in-between (i.e. k equals 4, and n equals 2) can remove the second-order harmonic wave component (i.e. k/2), and at least two Hall sensors that are arranged separated by a gap of p/8 in-between (i.e. k equals 8, and n equals 3) can remove the fourth-order harmonic wave component (i.e. k/2).

Here, if the fundamental wave is defined as a first-order harmonic wave component, then a first-order harmonic wave component is canceled when n equals 1 (k equals 2), a second-order harmonic wave component is canceled when n equals 2 (k equals 4), and a fourth-order harmonic wave component is canceled when n equals 3 (k equals 8).

A description is provided below, with reference to FIG. 3, on the canceling of a harmonic wave component, of an order that is lower than the k/2-th order harmonic wave component, by a sensor array according to an embodiment of the invention. For convenience, an example is used in which it is assumed that one sensor array comprises four Hall sensors, n equals 3, and k equals 8.

Figure 3:
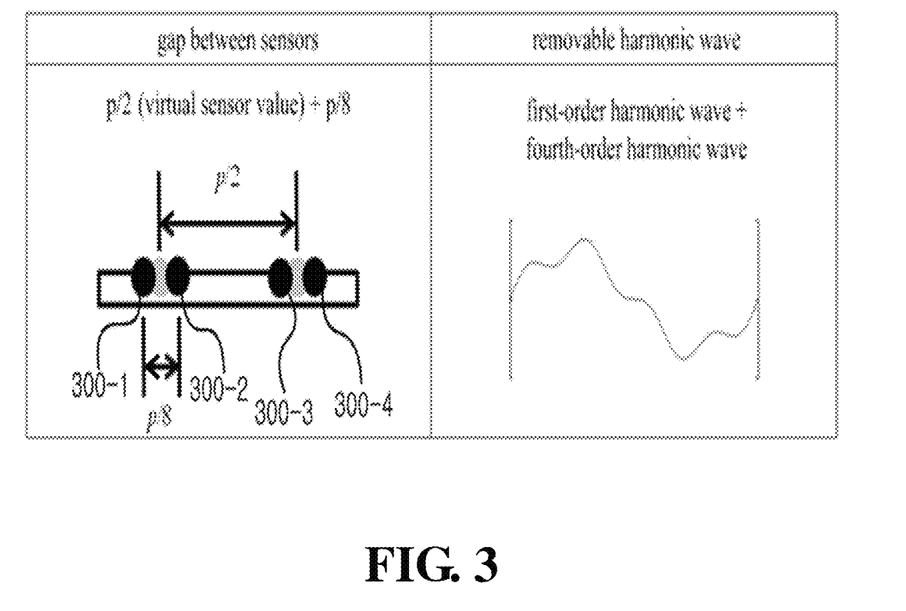
FIG. 3 illustrates the canceling of a harmonic wave component of an order that is lower than the k/2-th order harmonic wave component by a sensor array according to an embodiment of the invention.

As illustrated in FIG. 3, by averaging the measurement values of the two Hall sensors (black circles) on the left that are positioned with a gap of p/8, a virtual value can be obtained that represents a center point between the two Hall sensors.

Likewise, by averaging the measurement values of the two Hall sensors on the right that are positioned with a gap of p/8, a virtual value can be obtained that represents a center point between the two Hall sensors.

Here, if the gap between the two points (grey circles) calculating the virtual Hall sensor values becomes p/2, then the fundamental wave (i.e. k/2) can be removed just as if actual Hall sensors were installed with a gap of p/2.

That is, the fourth-order harmonic wave component can be removed from the measurement values of the Hall sensors arranged in p/8 intervals, while the fundamental wave (first-order harmonic wave component) can be removed from the virtual Hall sensor values, so that two waveforms can be removed concurrently.

In the description above, it is assumed for convenience that the gap between the two points (grey circles) for calculating virtual Hall sensor values is p/2, but the invention is not thus limited. For example, if the gap between the two points becomes p/4, then the second-order harmonic wave component can be removed.

In short, harmonic-wave components can be selectively removed as desired by way of actual Hall sensors and virtual Hall sensor values calculated by averaging their measurement values.

To generalize such a sensor array, the two or more sensors according to an embodiment of the invention can comprise a first sensor pair, which includes a 1-a sensor and a 1-b sensor that are arranged separated by a gap of p/k in-between, and a second sensor pair, which includes a 2-a sensor and a 2-b sensor that are arranged separated by a gap of p/k in-between.

Here, the center point between the 1-a sensor and the 1-b sensor and the center point between the 2-a sensor and the 2-b sensor can be arranged with a gap of p/j in-between (where j is $2^m$, and m is an integer greater than or equal to 1 but smaller than n).

In this way, by using the measurement values of the first sensor pair and the second sensor pair, at least one of the fundamental wave, the j/2-th order harmonic wave component, and the k/2-th order harmonic wave component can be canceled out.

Illustrated in FIG. 3 are a first sensor pair 300-1, 300-2 and a second sensor pair 300-3, 300-4. The center points of the sensor pairs are separated by a distance of p/2, so that a first-order and a fourth-order harmonic wave component can be removed simultaneously.

To further generalize the sensor array, a sensor array according to an embodiment of the invention can include a $2^n$ number of sensors (where n is a natural number) that are arranged separated by a particular distance in-between along an arrangement direction of the magnet sub-units, and such sensor array can be regarded as being able to remove n harmonic waves.

The $2^n$ sensors forming the sensor array may include a first sensor pair, which includes a 1-a sensor and a 1-b sensor arranged separated by a gap of $\lambda_M/2$ in-between, and a second sensor pair, which includes a 2-a sensor and a 2-b sensor arranged separated by a gap of $\lambda_M/2$ in-between.

The center point between the 1-a sensor and the 1-b sensor and the center point between the 2-a sensor and the 2-b sensor may be arranged separated by a gap of $\lambda_N/2$ in-between.

Here, $\lambda_M$ is the wavelength of an M-th order harmonic wave, and $\lambda_N$ is the wavelength of an N-th order harmonic wave, from among the multiple harmonic waves forming the magnetic flux density. The order of the M-th order harmonic wave may preferably be higher than the order of the N-th order harmonic wave.

By virtue of this sensor array, the measurement values of the first sensor pair and second sensor pair can be used to remove an n number of harmonic wave components from among the multiple number of harmonic wave components forming the magnetic flux density, with at least the M-th and N-th order harmonic wave components of the magnetic flux density included in the n harmonic wave components that are removed.

Figure 4:
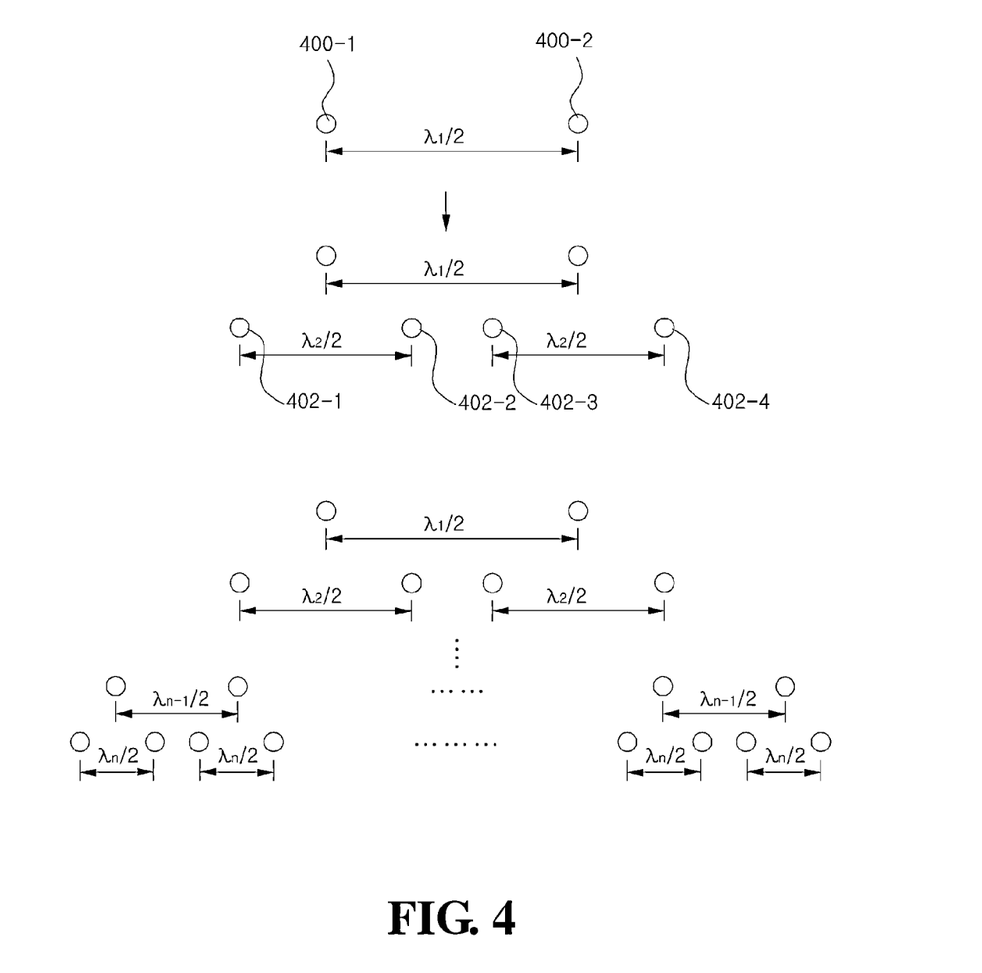
FIG. 4 schematically illustrates a removal of an n number of harmonic wave components by a $2^n$ number of sensor arrays according to an embodiment of the invention.

FIG. 4 schematically illustrates a removal of an n number of harmonic wave components by a $2^n$ number of sensor arrays according to an embodiment of the invention.

Referring to FIG. 4, for a physical quantity comprising a harmonic signal of wavelength $\lambda_1$, removing the harmonic signal from the physical quantity may require two sensors that measure at least this physical quantity.

The gap between the two sensors 400-1, 400-2 may be a half of the wavelength, in which case the outputs of the two sensors would be $f(x-\lambda_1/4)$ and $f(x+\lambda_1/4)$, where x is a dependent variable representing a change in the physical quantity.

If the output of a sensor that includes a harmonic signal is $A_1 \sin(2\pi x/\lambda_1)$, the sum of the outputs of the two sensors would be $A_1 \sin(2\pi x/\lambda_1-\pi/2)+A_1 \sin(2\pi x/\lambda_1+\pi/2)=0$, and as the output is 0, the harmonic signal would be removed.

If a harmonic signal included in the measured physical quantity is to be removed additionally, where the harmonic signal has a wavelength of $\lambda_2$, then four sensors 402-1 to 402-4 may be required, and the two sensors described above may each be divided into two sensors that are separated by a gap of one half of $\lambda_2$.

That is, the outputs of the four sensors would be $f(x-\lambda_1/4-\lambda_2/4)$, $f(x-\lambda_1/4+\lambda_2/4)$, $f(x+\lambda_1/4-\lambda_2/4)$, and $f(x+\lambda_1/4+\lambda_2/4)$, and if the output of a sensor that includes two harmonic functions is $A_1 \sin(2\pi x/\lambda_1+a_1)+A_1 \sin(2\pi x/\lambda_2+a_2)$, it can be seen that the two harmonic waves may be removed by the four sensors 402-1 to 402-4 above.

The sensor array described above can be expressed mathematically as follows.

$$L_i = \sum_{k=1}^{n} -(-1)^{\lfloor (i-1)|2^{n-k} \rfloor} \frac{\lambda_k}{4} \quad \text{[Equation 1]}$$

Here, $L_i$ is the position of the i-th sensor, and the operator (a|b) represents the integer quotient of a/b.

As shown in Equation 1 above, removing n harmonic signals ($\lambda_1 > \lambda_2 > \ldots > \lambda_n$) may require at least $2^n$ sensors, with the position of each sensor expressed by Equation 1.

The width of the sensor array can also be expressed mathematically as follows.

$$W_n = \sum_{k=1}^{n} \frac{\lambda_k}{2} \quad \text{[Equation 2]}$$

Here, $W_n$ is the overall width of the sensor array for removing harmonic signals.

Thus, in order to remove an n number of harmonic signals, a sensor array may be required that includes a minimum of $2^n$ sensors. The gap between an odd-number sensor and an even-number sensor can be half the wavelength of the harmonic signal having the shortest wavelength, and the gap between the center points of odd-number sensors and even-number sensors can be half the wavelength of the harmonic signal having the second shortest wavelength, so that harmonic wave components can be removed arbitrarily as desired even though the gaps between the sensors are not all uniform.

According to an embodiment of the invention, a sensor array can also comprise a k number of sensors arranged separated by a gap of p/k in-between along an arrangement direction of the magnet sub-units 112, and in this case, the fundamental wave through the k/2-th order harmonic wave component of the sine-wave magnetic flux density can be canceled as described above.

For example, when k equals 2 (n equals 1), the fundamental wave of the sine-wave magnetic flux density can be canceled by two sensors arranged separated by a gap of p/2; when k equals 4 (n equals 2), the fundamental wave and the second-order harmonic wave component of the sine-wave magnetic flux density can be canceled by four sensors arranged separated by a gap of p/4; and when k equals 8 (n equals 3), the fundamental wave, the second-order harmonic wave component, and the fourth-order harmonic wave component of the sine-wave magnetic flux density can be canceled by eight sensors arranged separated by a gap of p/8.

Here, a harmonic component of an order lower than that of the k/2-th order harmonic wave component can be canceled from the virtual Hall sensor values corresponding to the center points of two actual Hall sensors, as described above.

Also, if the fundamental wave is defined as a first-order harmonic wave component, then it can be said that one harmonic wave component may be canceled when n equals 1, two harmonic wave components may be canceled when n equals 2, and three harmonic wave components may be canceled when n equals 3.

According to an embodiment of the invention, the procedures for canceling at least one of the fundamental wave through the k/2-th order harmonic wave component can be performed by a measurement part (not shown) described below.

Finally, the measurement part (not shown) may measure the displacement of the magnet unit 110 and the sensor unit 120 that are displaced relatively to each other, based on the measurement values of the sensor unit 120.

A displacement measurement apparatus 100 according to an embodiment of the invention is described below in more detail with reference to FIG. 5 through FIG. 11. For convenience, the descriptions that follow will be provided using an example in which n is 2, k is 4, and one sensor array includes four Hall sensors, but the invention is not to be limited thus.

Figure 5:
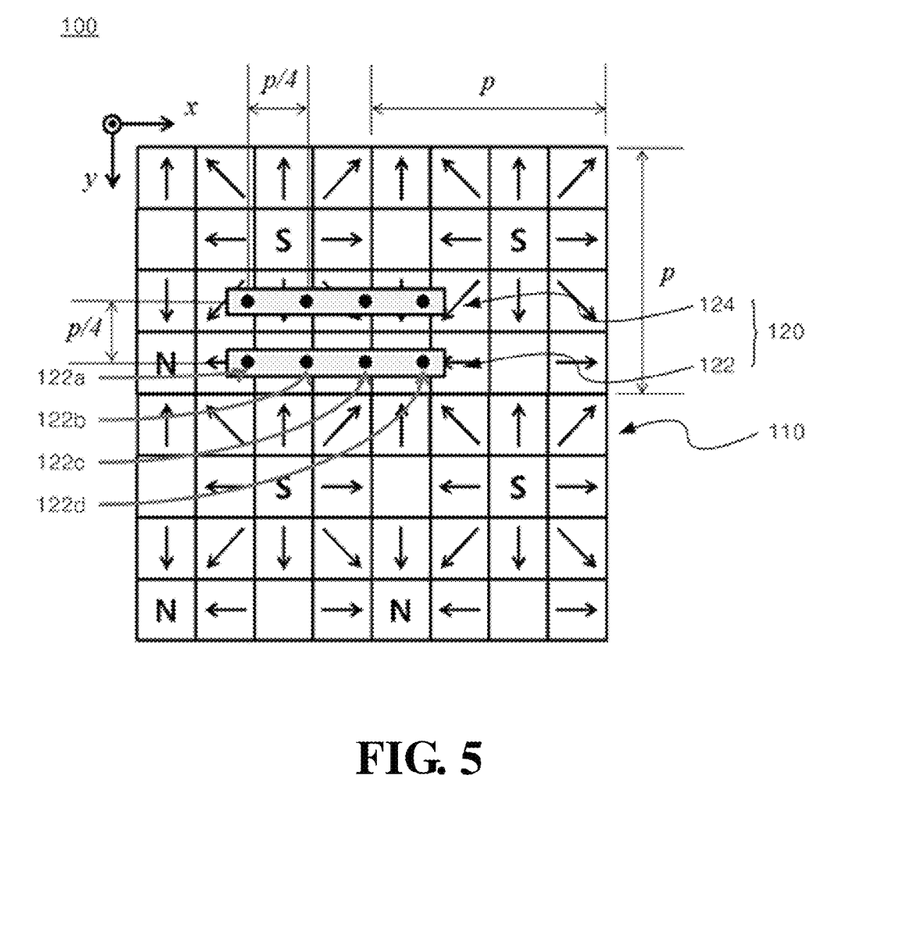
FIG. 5 illustrates the detailed composition of a displacement measurement apparatus according to an embodiment of the invention.

FIG. 5 illustrates the detailed composition of a displacement measurement apparatus 100 according to an embodiment of the invention.

Figure 6:
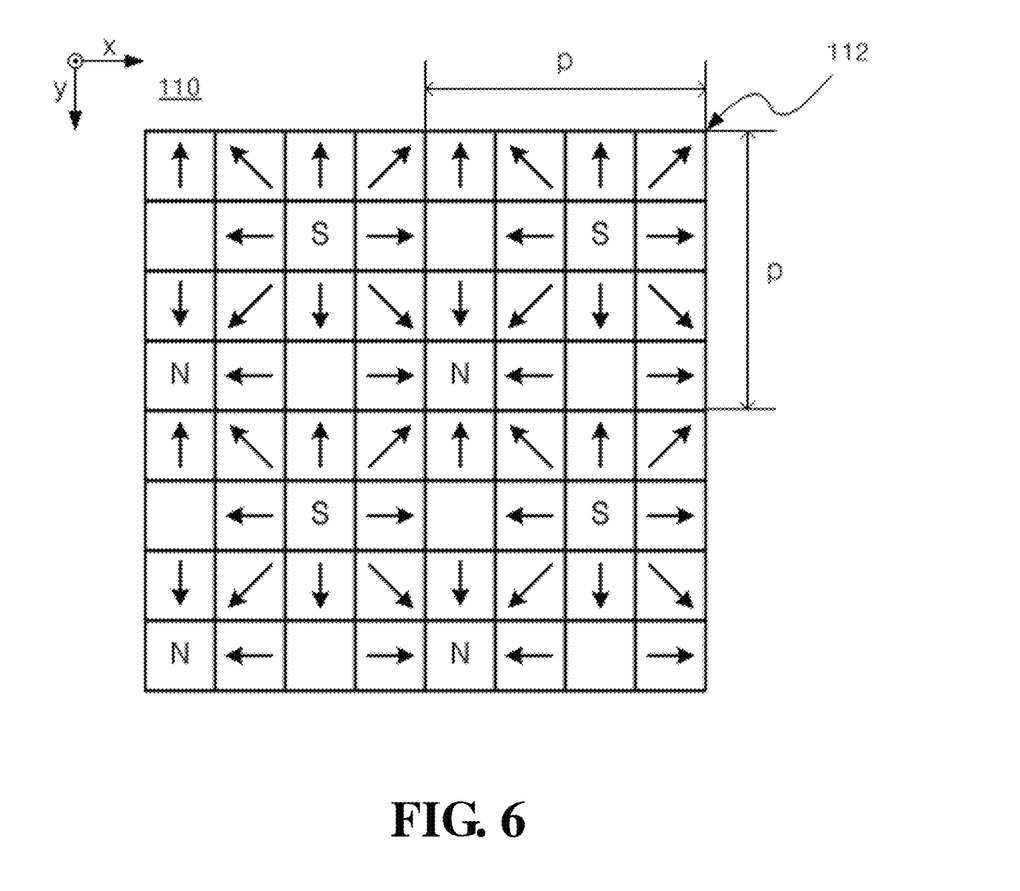
FIG. 6 illustrates only the magnet unit in a displacement measurement apparatus according to an embodiment of the invention.
Figure 7:
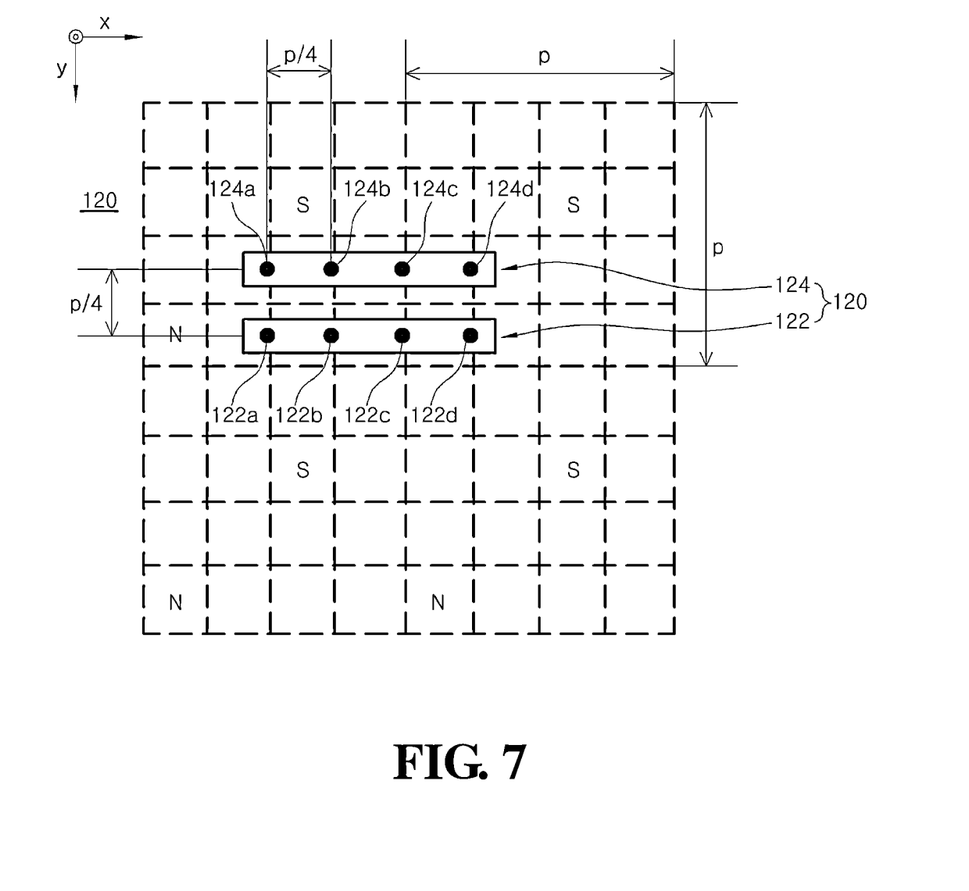
FIG. 7 illustrates the sensor unit in a displacement measurement apparatus according to an embodiment of the invention.

Also, FIG. 6 illustrates only the magnet unit 110 in the displacement measurement apparatus 100 according to an embodiment of the invention, while FIG. 7 illustrates the sensor unit 120 in the displacement measurement apparatus 100 according to an embodiment of the invention.

Referring to FIG. 5 through FIG. 7, a displacement measurement apparatus 100 according to an embodiment of the invention may include a magnet unit 110 positioned below, a sensor unit 120 positioned above, and a measurement part (not shown).

To be more specific, the magnet unit 110 may be positioned under the sensor unit 120, with magnet sub-units 112 arranged repeatedly in a particular pitch (p) to generate a sine-wave magnetic flux density.

Here, the magnet unit 110 can generate a sine-wave magnetic flux density in which either even order harmonic waves or odd order harmonic waves do not occur. For convenience, it will be assumed below that odd order harmonic waves (the third-order harmonic wave, the seventh-order harmonic wave, . . . ) do not occur.

For this purpose, a magnet unit 110 according to an embodiment of the invention can be arranged as a Halbach magnet array having a pitch p. A Halbach magnet array has less leakage flux but about 40% more magnetic flux compared to a simple NS magnet array, and is also characterized by not having odd order harmonic waves.

That is, as illustrated in FIG. 5 through FIG. 7, the magnet unit 110 can be arranged as a Halbach magnet array in which magnet sub-units 112 are arranged repeatedly in a particular pitch (p), where one magnet sub-unit 112 can be composed of sixteen cells, fourteen of which form magnets. The arrows represent the directions of magnetic flux.

Although the descriptions herein use a Halbach magnet array as an example of the magnet unit 110 for the sake of convenience, the invention is not limited thus. Various types of magnet arrays can be applied for generating a sine-wave magnetic flux density, or as the magnet unit according to an embodiment of the invention, various types of magnet arrays, etc., can be applied for generating a sine-wave magnetic flux density in which either even order harmonic waves or odd order harmonic waves do not occur.

Next, a sensor unit 120 according to an embodiment of the invention may be positioned over the magnet unit 110, and may include sensor arrays 122, 124 that measure the sine-wave magnetic flux density generated by the magnet unit 110.

As described below, the measurement value of a sensor array 122 may calculate a measurement value of either one of the x-direction or the y-direction, so that in order to measure a displacement in at least one direction, it may be desirable to include two or more sensor arrays 122, 124.

According to an embodiment of the invention, a sensor array may have two or more Hall sensors arranged with a gap of p/k in-between in either the row or column direction of the magnet sub-unit array, k can be expressed by $2^n$, and n is an integer greater than or equal to 1, as already described above.

By this sensor array, at least one of the fundamental wave through the k/2-th order harmonic wave component of a sine-wave magnetic flux density generated by the magnet unit 110 having a particular pitch (p) can be canceled.

That is, a sine-wave magnetic flux density, in which odd order harmonic wave components do not occur, can be generated by the magnet unit 110 according to an embodiment of the invention, and the remaining harmonic wave components can be selectively canceled by the sensor arrays of the sensor unit 120 that measures such magnetic flux density, so that an embodiment of the invention makes it possible to calculate stable measurement values in which harmonic wave components are removed.

Referring to FIG. 5 through FIG. 7, a sensor unit 120 according to an embodiment of the invention can include a 1-1 sensor array 122, in which four Hall sensors 122a, 122b, 122c, 122d are arranged separated from each other by a gap of p/4 along the x-direction, and a 1-2 sensor array 124, in which four Hall sensors 124a, 124b, 124c, 124d are arranged separated from each other by a gap of p/4 along the x-direction.

The 1-1 sensor array 122 and the 1-2 sensor array 124 can be arranged separated from each other by a gap of p/k, i.e. p/4, along the y-direction.

In short, the 1-1 sensor array and the 1-2 sensor array may each be structured to have four Hall sensors that are arranged separated by a gap of p/4 in-between along the x-direction, while the 1-1 sensor array and the 1-2 sensor array may themselves be arranged separated from each other by a gap of p/4, to cancel the fundamental wave and a harmonic wave component of the sine-wave magnetic flux density and enable the measurement part (not shown) described below to measure displacement in the y-direction as well.

The procedure for measuring displacement by the measurement part (not shown) may be substantially the same as conventional procedures for measuring displacement utilizing an encoder. As such, the descriptions herein will focus more on the sensor array that can remove harmonic waves to stabilize measurement values and minimize the number of Hall sensors used.

A measurement part (not shown) according to an embodiment of the invention may measure the displacement of the magnet unit 110 and the sensor unit 120, which are displaced relatively to each other, based on the measurement values of the sensor unit 120.

To be more specific, the measurement part (not shown) can compute the sum of measurement values measured by the four Hall sensors 122a, 122b, 122c, and 122d in the 1-1 sensor array 122 (hereinafter referred to as the "1-1 measurement value" for convenience) and compute the sum of measurement values measured by the four Hall sensors 124a, 124b, 124c, and 124d in the 1-2 sensor array 124 (hereinafter referred to as the "1-2 measurement value" for convenience) to remove the fundamental wave and the harmonic wave component in the x-direction from each of the 1-1 measurement value and the 1-2 measurement value, and can measure the displacement in the y-direction by using the 1-1 measurement value and 1-2 measurement value from which the fundamental wave and the harmonic wave component in the x-direction have been removed.

If the distance between the magnet unit 110 arranged as a Halbach magnet array and the sensor unit 120 is kept constant, the magnetic flux density measured by a Hall sensor from a point separated above the Halbach magnet array by z can be expressed as Equation 3 below.

$$B = B_p(z)(\sin[ax] + \sin[ay])$$ [Equation 3]

where, $a = 2\pi/p$

Here, $B_p(z)$ represents the maximum value of the magnetic flux density.

Also, the measurement values measured by the four Hall sensors 122a, 122b, 122c, 122d in the 1-1 sensor array 122 can be expressed by Equation 4.

$$V_{[1]} = \sin[ax] + \sin[ay] + e$$

$$V_{[2]} = \sin[ax + 2\pi/4] + \sin[ay] + e$$

$$V_{[3]} = \sin[ax + 4\pi/4] + \sin[ay] + e$$

$$V_{[4]} = \sin[ax + 6\pi/4] + \sin[ay] + e$$ [Equation 4]

Here, $V_{[1]}$ is the measurement value measured by the first Hall sensor 122a of the 1-1 sensor array 122, $V_{[2]}$ is the measurement value measured by the second Hall sensor 122b, $V_{[3]}$ is the measurement value measured by the third Hall sensor 122c, and $V_{[4]}$ is the measurement value measured by the fourth Hall sensor 122d. Here, the measurement values may be obtained as voltage values, due to the properties of Hall sensors.

The measurement part (not shown) can compute the sum of the measurement values measured by the four Hall sensors (the 1-1 measurement value) as shown below in Equation 5.

$$V_{[1]} + V_{[2]} + V_{[3]} + V_{[4]} = V_{[6]} \approx 4 \sin[ay]$$ [Equation 5]

As can be seen from Equation 5, the sum of voltage values measured by the four Hall sensors 122a, 122b, 122c, 122d that are arranged separated by a gap of p/4 in-between in the x-direction (i.e. the 1-1 measurement value) may provide a result in which only the y-direction component is amplified at the point where the 1-1 sensor array 122 is positioned.

In the same manner, the sum of voltage values measured by the four Hall sensors 124a, 124b, 124c, 124d of the 1-2 sensor array 124 (i.e. the 1-2 measurement value) may provide a result in which only the y-direction component is amplified at the point where the 1-2 sensor array 124 is positioned.

Since the 1-1 sensor array 122 and the 1-2 sensor array 124 are arranged separated by a gap of p/4 in-between along the column direction as described above, the measurement part (not shown) can measure the displacement in the y-direction by using the 1-1 measurement value and the 1-2 measurement value as directional vectors.

Moreover, the sensor unit 120 can further include a 2-1 sensor array 126 and a 2-2 sensor array 128 for measuring displacement in the x-direction.

Figure 8:
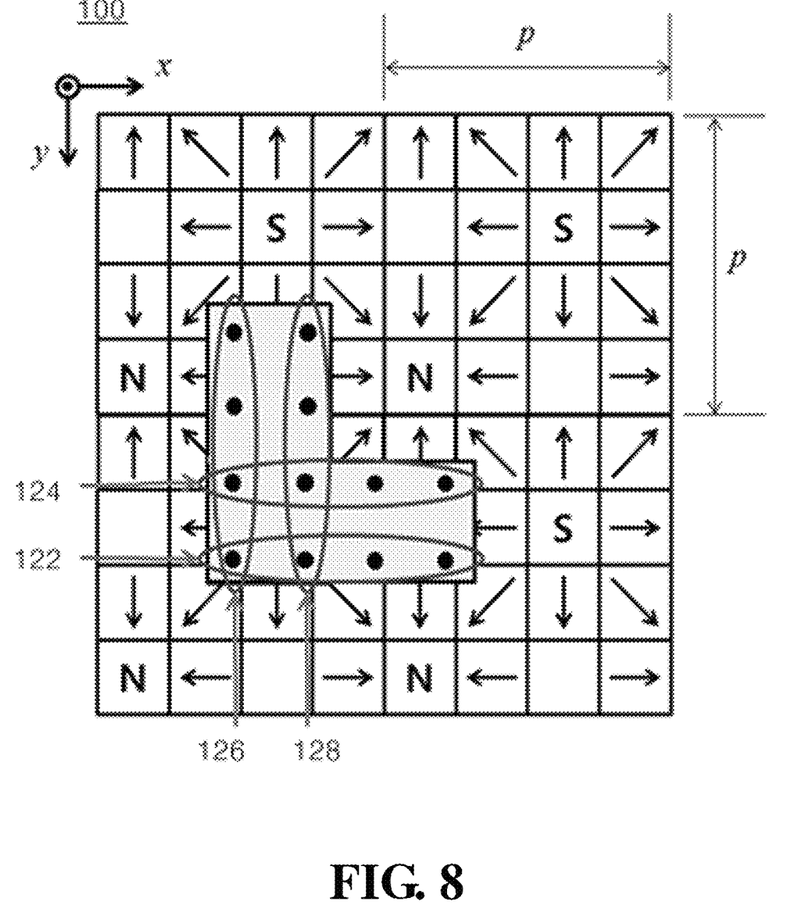
FIG. 8 illustrates the detailed composition of a displacement measurement apparatus that includes four sensor arrays according to an embodiment of the invention.
Figure 9:
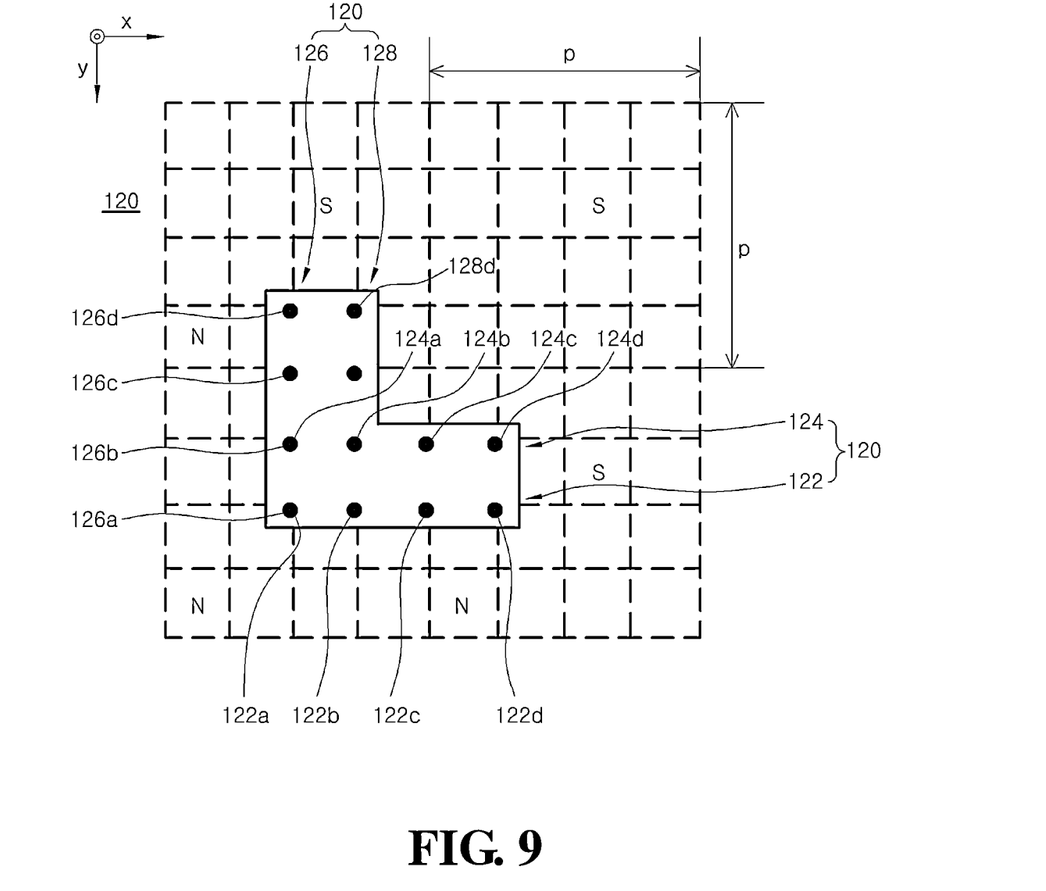
FIG. 9 illustrates the sensor unit of FIG. 8.

FIG. 8 illustrates the detailed composition of a displacement measurement apparatus 100 that includes four sensor arrays 122, 124, 126, 128 according to an embodiment of the invention, and FIG. 9 illustrates the sensor unit 120 of FIG. 8.

As illustrated in FIG. 8 and FIG. 9, the sensor unit 120 can include not only the 1-1 sensor array 122 and the 1-2 sensor array 124, but also a 2-1 sensor array 126, in which four Hall sensors 126a, 126b, 126c, 126d are arranged separated by a gap of p/4 in-between along the y-direction, and a 2-2 sensor array 128, in which four Hall sensors 128a, 128b, 128c, 128d are arranged separated by a gap of p/4 in-between along the y-direction.

Here, since the measurement values of the 1-1 sensor array 122 and the 1-2 sensor array 124 may calculate the magnetic flux density with the fundamental wave and harmonic wave components of the x-direction removed, i.e. calculate only the y-direction component values, at their locations as described above, the measurement values can be used for measuring the displacement along the y-direction.

In the same manner, the measurement values at the 2-1 sensor array 126 and the 2-2 sensor array 128 may calculate the magnetic flux density with the fundamental wave and harmonic wave components of the y-direction removed, i.e. calculate only the x-direction component values, at their locations, the measurement values can be used for measuring the displacement along the x-direction.

If the sensor unit 120 includes four sensor arrays 122, 124, 126, 128 as illustrated in FIG. 8 and FIG. 9, some of the sensors forming the sensor arrays may be redundant.

That is, the first sensor 122a forming the 1-1 sensor array can also be the first sensor 126a forming the 2-1 sensor array, and the second sensor 122b of the 1-1 sensor array can also be the first sensor 128a forming the 2-2 sensor array.

Likewise, the first sensor 124a forming the 1-2 sensor array can also be the second sensor 126b forming the 2-1 sensor array, and the second sensor 124b of the 1-2 sensor array can also be the second sensor 128b forming the 2-2 sensor array.

In this way, the four sensor arrays used for measuring displacement in the x-direction and y-direction can have some of their sensors used dually, so that four fewer Hall sensors can be used overall. Thus, an embodiment of the invention can provide the advantage of minimizing the number of Hall sensors used in measuring displacement.

Figure 10:
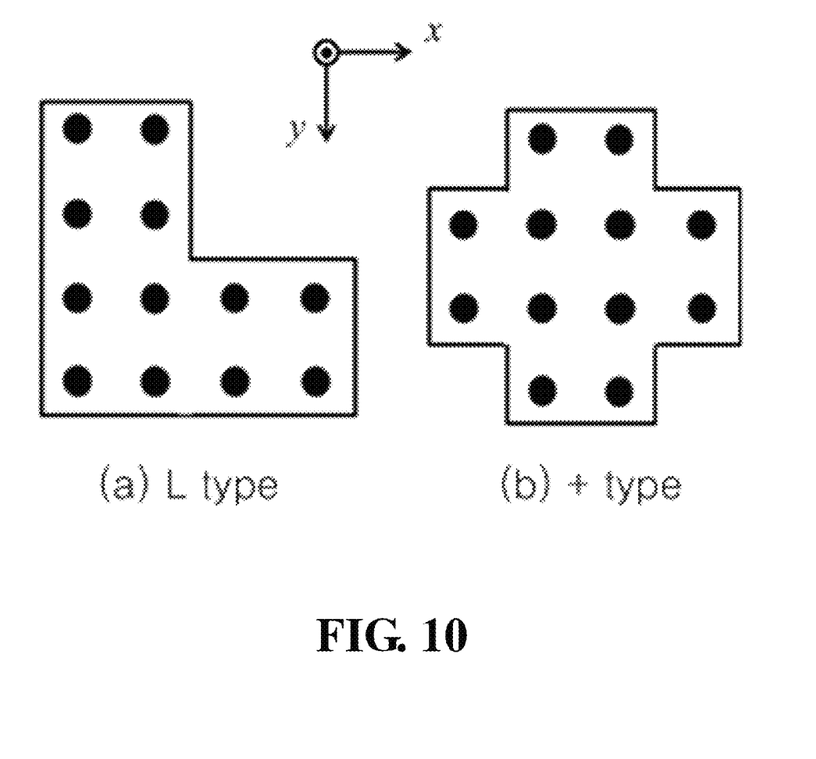
FIG. 10 illustrates various forms of sensor arrays for a sensor unit according to an embodiment of the invention.

FIG. 10 illustrates various forms of sensor arrays for a sensor unit 120 according to an embodiment of the invention.

As illustrated in FIG. 10, the four sensor arrays used for measuring displacement in the x-direction and y-direction can be of an L-shaped type or a cross-shaped type.

It can be seen that four fewer Hall sensors are used, regardless of the type of sensor array formation.

Figure 11:
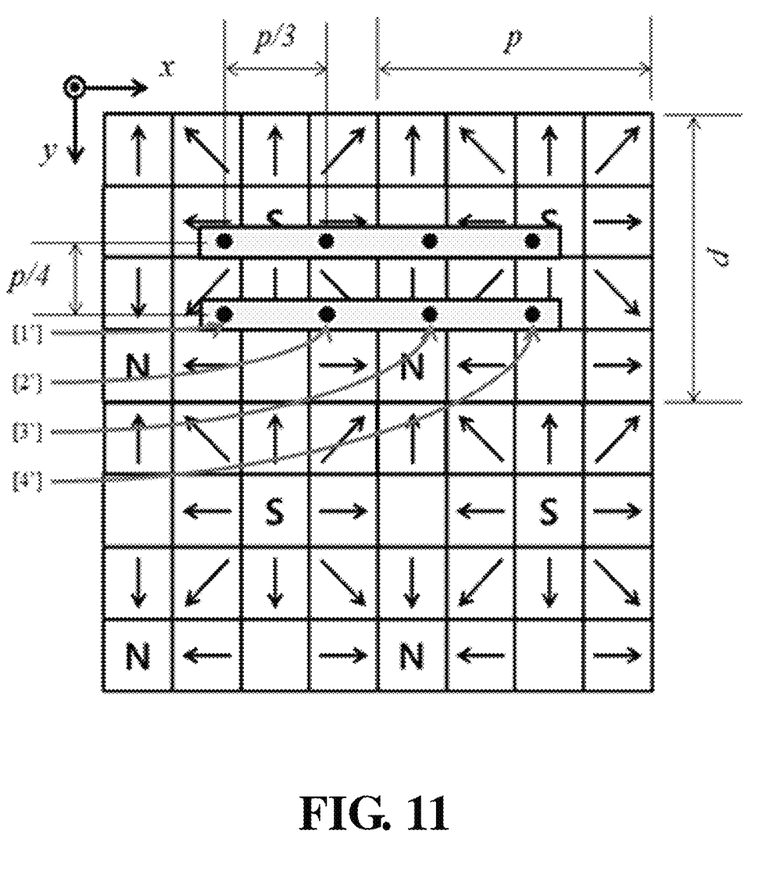
FIG. 11 illustrates a sensor array for comparison with a displacement measurement apparatus according to an embodiment of the invention.

FIG. 11 illustrates a sensor array for comparison with a displacement measurement apparatus 100 according to an embodiment of the invention.

As illustrated in FIG. 11, if four Hall sensors are arranged separated from one another by a gap of p/3 along the x-direction, i.e. not separated by a gap of p/4, it can be seen that the arrangement of the sensors is not advantageous in removing harmonic waves and also has a relatively larger size.

Also, since the gap between the Hall sensors (p/3) is different from the gap between arrays (p/4), it may be needed to implement a sensor array for measuring displacement in the x-direction and a sensor array for measuring displacement in the y-direction independently.

In contrast, according to an embodiment of the invention, the sensor arrays needed for measuring the displacement in the x-direction and y-direction can be implemented in an integrated form, in an L shape, a cross shape, or a T shape, etc., to minimize the number of Hall sensors and allow efficient use of space. Furthermore, it is possible to remove harmonic waves to provide stable measurement values.

While the present invention has been described above using particular examples, including specific elements, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. An apparatus for measuring displacement, the apparatus comprising:
   a magnet unit having magnet sub-units arranged repeatedly in a particular pitch (p) to generate a sine-wave magnetic flux density;
   a sensor unit including a sensor array for measuring the sine-wave magnetic flux density; and
   a measurement part configured to measure a displacement of the magnet unit and the sensor unit displaced relatively to each other, based on the measured value of the sine-wave magnetic flux density, wherein
   the sensor array comprises a 1-1 sensor array comprising two or more sensors arranged separated by a gap of p/k (where k is $2^n$, n is an integer greater than or equal to 1) in-between along a first arrangement direction of the magnet sub-units and a 1-2 sensor array separated from the 1-1 sensor array by a gap of p/k in-between along a second arrangement direction of the magnet sub-units, the 1-2 sensor array comprising two or more sensors arranged separated by a gap of p/k in-between along the first arrangement direction, and
   the measurement part calculates a sum of measurement values measured by the two or more sensors of the 1-1 sensor array (a 1-1 measurement value) to remove a fundamental wave and a harmonic wave component of the first arrangement direction and measures the displacement along the second arrangement direction based on the 1-1 measurement value having the fundamental wave and the harmonic wave component of the first arrangement direction removed.

2. The apparatus for measuring displacement of claim 1, wherein the measurement part cancels at least one of a fundamental wave through a k/2-th order harmonic wave component of the sine-wave magnetic flux density by using the measurement values of the two or more sensors of the sensor array.

3. The apparatus for measuring displacement of claim 2, wherein the two or more sensors of the 1-1 sensor array and the two or more sensors of the 1-2 sensor array comprise:
   a first sensor pair having a 1-a sensor and a 1-b sensor arranged separated by a gap of p/k in-between; and
   a second sensor pair having a 2-a sensor and a 2-b sensor arranged separated by a gap of p/k in-between,
   and wherein a center point between the 1-a sensor and the 1-b sensor and a center point between the 2-a sensor and the 2-b sensor are arranged separated by a gap of p/j in-between (where j is $2^m$, m is an integer greater than or equal to 1 but smaller than n).

4. The apparatus for measuring displacement of claim 3, wherein the measurement part cancels at least one of a fundamental wave of the sine-wave magnetic flux density, a j/2-th order harmonic wave component, and a k/2-th order harmonic wave component by using the measurement values of the first sensor pair and the second sensor pair.

5. The apparatus for measuring displacement of claim 1, wherein the measurement part calculates a sum of measurement values measured by the two or more sensors of the 1-2 sensor array (a 1-2 measurement value) to remove a fundamental wave and a harmonic wave component of the first arrangement direction, and measures the displacement along the second arrangement direction based on the 1-2 measurement value having the fundamental wave and the harmonic wave component of the first arrangement direction removed.

6. The apparatus for measuring displacement of claim 1, wherein the magnet unit is arranged as a Halbach magnet array.

7. The apparatus for measuring displacement of claim 1, wherein the sensor is a Hall sensor.

8. The apparatus for measuring displacement of claim 1, wherein each of the 1-1 sensor array and the 1-2 sensor array comprises a $2^n$ (n is a natural number) number of sensors arranged separated by a particular distance in-between along an arrangement direction of the magnet sub-units,
   the $2^n$ number of sensors comprise a first sensor pair having a 1-a sensor and a 1-b sensor arranged separated by a gap of $\lambda_M/2$ in-between, and a second sensor pair having a 2-a sensor and a 2-b sensor arranged separated by a gap of $\lambda_M/2$ in-between, where $\lambda_M$ is a wavelength of an M-th order harmonic wave forming the magnetic flux density,
   and a center point between the 1-a sensor and the 1-b sensor and a center point between the 2-a sensor and the 2-b sensor are arranged separated by a gap of $\lambda_N/2$ in-between, where $\lambda_N$ is a wavelength of an N-th order harmonic wave forming the magnetic flux density.

9. An apparatus for measuring displacement, the apparatus comprising:
   a magnet unit having magnet sub-units arranged repeatedly in a particular pitch (p) to generate a sine-wave magnetic flux density;
   a sensor unit including a sensor array for measuring the sine-wave magnetic flux density; and
   a measurement part configured to measure a displacement of the magnet unit and the sensor unit displaced relatively to each other, based on the measured value of the sine-wave magnetic flux density,
   wherein the sensor array comprises a 1-1 sensor array comprising k number of sensors arranged separated by a gap of p/k (where k is $2^n$, n is an integer greater than or equal to 1) in-between along a first arrangement direction of the magnet sub-units and a 1-2 sensor array separated from the 1-1 sensor array by a gap of p/k in-between along a second arrangement direction of the magnet sub-units, the 1-2 sensor array comprising k number of sensors arranged separated by a gap of p/k in-between along the first arrangement direction, and
   the measurement part calculates a sum of measurement values measured by the k number of sensors of the 1-1 sensor array (a 1-1 measurement value) to remove a fundamental wave and a harmonic wave component of the first arrangement direction, and measures the displacement along the second arrangement direction based on the 1-1 measurement value having the fundamental wave and the harmonic wave component of the first arrangement direction removed.

10. The apparatus for measuring displacement of claim 9, wherein the measurement part cancels at least one of a fundamental wave through a k/2-th order harmonic wave component of the sine-wave magnetic flux density by using the measurement values of the k number of sensors of the sensor array.

11. An apparatus for measuring displacement, the apparatus comprising:
    a magnet unit having magnet sub-units arranged repeatedly to generate a magnetic flux density;

a sensor unit including a sensor array for measuring the magnetic flux density; and a measurement part configured to measure a displacement of the magnet unit and the sensor unit displaced relatively to each other, based on the measured value of the magnetic flux density, wherein the sensor array comprises a 1-1 sensor array comprising $2^n$ (n is a natural number) number of sensors arranged separated by a particular distance in-between along a first arrangement direction of the magnet sub-units and a 1-2 sensor array separated from the 1-1 sensor array by a particular distance in-between along a second arrangement direction of the magnet sub-units, the 1-2 sensor array comprising $2^n$ number of sensors arranged separated by a particular distance in-between along the first arrangement direction, each of the $2^n$ number of sensors of the 1-1 sensor array and the $2^n$ number of sensors of the 1-2 sensor array comprises a first sensor pair having a 1-a sensor and a 1-b sensor arranged separated by a gap of $\lambda_M/2$ in-between, and a second sensor pair having a 2-a sensor and a 2-b sensor arranged separated by a gap of $\lambda_M/2$ in-between, where $\lambda_M$ is a wavelength of an M-th order harmonic wave forming the magnetic flux density, a center point between the 1-a sensor and the 1-b sensor and a center point between the 2-a sensor and the 2-b sensor are arranged separated by a gap of $\lambda_N/2$ in-between, where $\lambda_N$ is a wavelength of an N-th order harmonic wave forming the magnetic flux density, and the measurement part calculates a sum of measurement values measured by the $2^n$ number of sensors of the 1-1 sensor array (a 1-1 measurement value) to remove a fundamental wave and a harmonic wave component of the first arrangement direction and measures the displacement along the second arrangement direction based on the 1-1 measurement value having the fundamental wave and the harmonic wave component of the first arrangement direction removed.

12. The apparatus for measuring displacement of claim 11, wherein an order of the M-th order harmonic wave is higher than an order of the N-th order harmonic wave.

13. The apparatus for measuring displacement of claim 11, wherein the measurement part removes a n number of harmonic wave components from among a plurality of harmonic wave components forming the magnetic flux density by using measurement values of the first sensor pair and the second sensor pair.

14. The apparatus for measuring displacement of claim 13, wherein the n number of harmonic wave components include at least the M-th order and N-th order harmonic wave components of the magnetic flux density.

* * * * *